(12) United States Patent
Ohyama

(10) Patent No.: US 11,175,498 B2
(45) Date of Patent: Nov. 16, 2021

(54) VIRTUAL IMAGE DISPLAY DEVICE, INTERMEDIATE IMAGE FORMATION UNIT, AND IMAGE DISPLAY LIGHT GENERATION UNIT

(71) Applicant: JVC KENWOOD Corporation, Yokohama (JP)

(72) Inventor: Minoru Ohyama, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 266 days.

(21) Appl. No.: 16/448,207

(22) Filed: Jun. 21, 2019

(65) Prior Publication Data

US 2019/0302454 A1 Oct. 3, 2019

Related U.S. Application Data

(63) Continuation of application No. PCT/JP2018/007215, filed on Feb. 27, 2018.

(30) Foreign Application Priority Data

Jun. 8, 2017 (JP) .............................. JP2017-113208

(51) Int. Cl.
*G02B 27/01* (2006.01)
*G02B 3/00* (2006.01)
(Continued)

(52) U.S. Cl.
CPC .......... *G02B 27/0101* (2013.01); *B60K 35/00* (2013.01); *G02B 3/0006* (2013.01);
(Continued)

(58) Field of Classification Search
CPC .......... G02B 27/0101; G02B 2027/013; G02B 2027/0145; G02B 3/0006;
(Continued)

(56) References Cited

U.S. PATENT DOCUMENTS 2,660,927 A * 12/1953 Burton ................. G03B 21/602
359/459
2,991,693 A * 7/1961 MacNeille ........... G03B 21/602
359/455

(Continued)

FOREIGN PATENT DOCUMENTS

JP 2017015806 A 1/2017

*Primary Examiner* — Zachary W Wilkes
(74) *Attorney, Agent, or Firm* — Brundidge & Stanger, P.C.

(57) ABSTRACT

A virtual image display device includes an intermediate image formation unit on which a real image based on an image display light is formed. The intermediate image formation unit includes a principal surface on which a first area, a second area, and a third area are arranged in a stated order in a predetermined direction, and a reflective part. The first area is provided with a transmission-type screen on which a first display light forms an image, and the third area is provided with a reflection-type screen on which a second display light forms an image. The first display light is transmitted through the transmission-type screen, reflected by the reflective part, transmitted through the second area, and output toward a projection mirror. The second display light is reflected by the reflection-type screen and output toward the projection mirror.

10 Claims, 7 Drawing Sheets

(51) Int. Cl.
    *G02B 17/08* (2006.01)
    *G02B 26/10* (2006.01)
    *B60K 35/00* (2006.01)
    *H04N 5/74* (2006.01)
    *G09G 3/20* (2006.01)
    *G03B 21/602* (2014.01)

(52) U.S. Cl.
    CPC ........... *G02B 17/086* (2013.01); *G02B 26/10* (2013.01); *G02B 27/01* (2013.01); *G02B 27/0149* (2013.01); *G03B 21/602* (2013.01); *G09G 3/20* (2013.01); *H04N 5/74* (2013.01); *G02B 2027/0127* (2013.01); *G02B 2027/0145* (2013.01); *G02B 2027/0154* (2013.01)

(58) Field of Classification Search
    CPC ........ G02B 17/0856–086; G03B 21/56; G03B 21/60; G03B 21/602; G03B 21/625
    USPC .......................................................... 359/630
    See application file for complete search history.

(56) References Cited

U.S. PATENT DOCUMENTS

| | | | | |
|---|---|---|---|---|
| 4,232,939 A * | 11/1980 | Kikuchi | ............... | G03B 21/602 359/459 |
| 4,832,427 A * | 5/1989 | Nanba | ................ | G02B 27/0018 359/15 |
| 7,869,126 B2 * | 1/2011 | Akiyama | ............... | G03B 21/60 359/454 |
| 8,422,112 B2 * | 4/2013 | Li | ...................... | G02B 27/0018 359/246 |
| 8,675,283 B2 * | 3/2014 | Fujikawa | ........... | G02B 27/0101 359/630 |
| 8,724,226 B2 * | 5/2014 | Moussa | .............. | G02B 27/0101 359/631 |
| 8,736,964 B2 * | 5/2014 | Imahori | ............. | G02B 27/0101 359/633 |
| 8,867,138 B2 * | 10/2014 | Kobayashi | ............. | G02B 27/01 359/630 |
| 9,229,310 B2 * | 1/2016 | Pelletier | ................ | G02B 5/0284 |
| 9,529,196 B1 * | 12/2016 | Sade | ................... | G02B 27/0172 |
| 9,551,868 B2 * | 1/2017 | Yamakawa | ........ | G02B 27/0961 |
| 9,606,355 B2 * | 3/2017 | Larson | ................... | B64D 43/02 |
| 9,791,697 B2 * | 10/2017 | Yamaguchi | .......... | G02B 27/142 |
| 9,851,560 B2 * | 12/2017 | Chou | ................... | G02B 3/0056 |
| 10,302,939 B2 * | 5/2019 | Morohashi | ............. | H04N 13/30 |
| 10,509,225 B2 * | 12/2019 | Chiba | ................ | G03B 21/2033 |
| 10,578,780 B2 * | 3/2020 | Lee | ....................... | G02B 5/0215 |
| 10,670,864 B2 * | 6/2020 | Hirata | .................. | G02B 5/3025 |
| 10,859,826 B2 * | 12/2020 | Hayakawa | ......... | G02B 27/0172 |
| 10,884,242 B2 * | 1/2021 | Wada | ....................... | G02B 5/10 |
| 10,901,209 B2 * | 1/2021 | Kasahara | .............. | G02B 27/01 |
| 2014/0198368 A1 * | 7/2014 | Urey | .................. | G02B 27/0172 359/226.1 |
| 2016/0004081 A1 * | 1/2016 | Kasahara | ............. | G02B 27/0172 345/633 |
| 2018/0315361 A1 * | 11/2018 | Onda | .................. | G02B 3/0006 |
| 2019/0116344 A1 * | 4/2019 | Nguyen | ................ | H04N 9/317 |
| 2020/0026073 A1 * | 1/2020 | Nambara | ............. | G02B 27/286 |

\* cited by examiner

VIRTUAL IMAGE DISPLAY DEVICE, INTERMEDIATE IMAGE FORMATION UNIT, AND IMAGE DISPLAY LIGHT GENERATION UNIT

CROSS REFERENCE TO RELATED APPLICATION

Priority is claimed to Japanese Patent Application No. 2017-113208, filed on Jun. 8, 2017, the entire content of which is incorporated herein by reference.

BACKGROUND OF THE INVENTION

1. Field of the Invention

The present invention relates to a virtual image display device, an intermediate image formation unit, and an image display light generation unit.

2. Description of the Related Art

Recently, head-up displays are available for use as display devices for vehicles. A head-up display projects an image display light toward, for example, a windshield of a vehicle, superimposes a virtual image based on the image display light on the scenery outside the vehicle. The image display light forms an image on a screen, and the image on the screen is presented as a virtual image. There have been proposals for modes to provide added values to a head-up display by tilting a virtual image along the road surface or presenting a plurality of virtual images at different positions in the direction of depth viewed from a user. For example, the first portion and the second portion of an image display light projected from a projector are configured to travel on different light paths to present virtual images at a plurality of different positions in the direction of depth.

It is preferred to present virtual images at a plurality of different positions in the direction of depth with a smaller number of components.

SUMMARY OF THE INVENTION

The embodiments address the above-described issue, and a general purpose thereof is to provide a technology capable of presenting virtual images in a more suitable manner.

A virtual image display device according to an embodiment includes: a projection unit that projects an image display light; an intermediate image formation unit on which a real image based on the image display light is formed; and a projection mirror that reflects the image display light output from the intermediate image formation unit toward a virtual image presentation plane. The intermediate image formation unit includes a reference surface on which the image display light is incident and a reflective part that reflects a portion of the image display light transmitted through the reference surface toward the reference surface. The reference surface includes a first area, a second area, and a third area arranged in a stated order in a predetermined direction along the reference surface. The first area is provided with a transmission-type screen on which a first display light that is a portion of the image display light forms an image, and the third area is provided with a reflection-type screen on which a second display light that is another portion of the image display light forms an image, the first display light is transmitted through the transmission-type screen, reflected by the reflective part, transmitted through the second area, and output toward the projection mirror, and the second display light is reflected by the reflection-type screen and output toward the projection mirror.

Another embodiment of the present invention relates to an intermediate image formation unit. A real image based on an image display light is formed on the intermediate image formation unit, and the intermediate image formation unit includes a substrate adapted to transmit the image display light. The substrate includes a first principal surface and a second principal surface opposite to the first principal surface. The first principal surface includes a first area, a second area, and a third area arranged in a stated order in a predetermined direction along the first principal surface. The first area is provided with a transmission-type screen, the third area is provided with a reflection-type screen, and the second principal surface is provided with a reflective layer that reflects light incident on the substrate via the first area and outputs the light from the substrate via the second area.

Still another embodiment of the present invention relates to an image display light generation unit. An image display light generation unit includes: a projection unit that projects an image display light; an intermediate image formation unit on which a real image based on the image display light is formed; and a fixing member on which the projection unit and the intermediate image formation unit are mounted. The intermediate image formation unit includes a reference surface on which the image display light is incident and a reflective part that reflects a portion of the image display light transmitted through the reference surface toward the reference surface. The reference surface includes a first area, a second area, and a third area arranged in a stated order in a predetermined direction along the reference surface, the first area is provided with a transmission-type screen, and the third area is provided with a reflection-type screen. The fixing member defines relative positions of the projection unit and the intermediate image formation unit such that i) a first display light that is a portion of the image display light forms an image on the transmission-type screen, is transmitted through the transmission-type screen, is reflected by the reflective part, is transmitted through the second area, and is output from the intermediate image formation unit, and ii) a second display light that is another portion of the image display light is reflected by the reflection-type screen and output from the intermediate image formation unit.

Optional combinations of the aforementioned constituting elements and constituting elements and implementations of the invention in the form of methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration.

Figure 1:
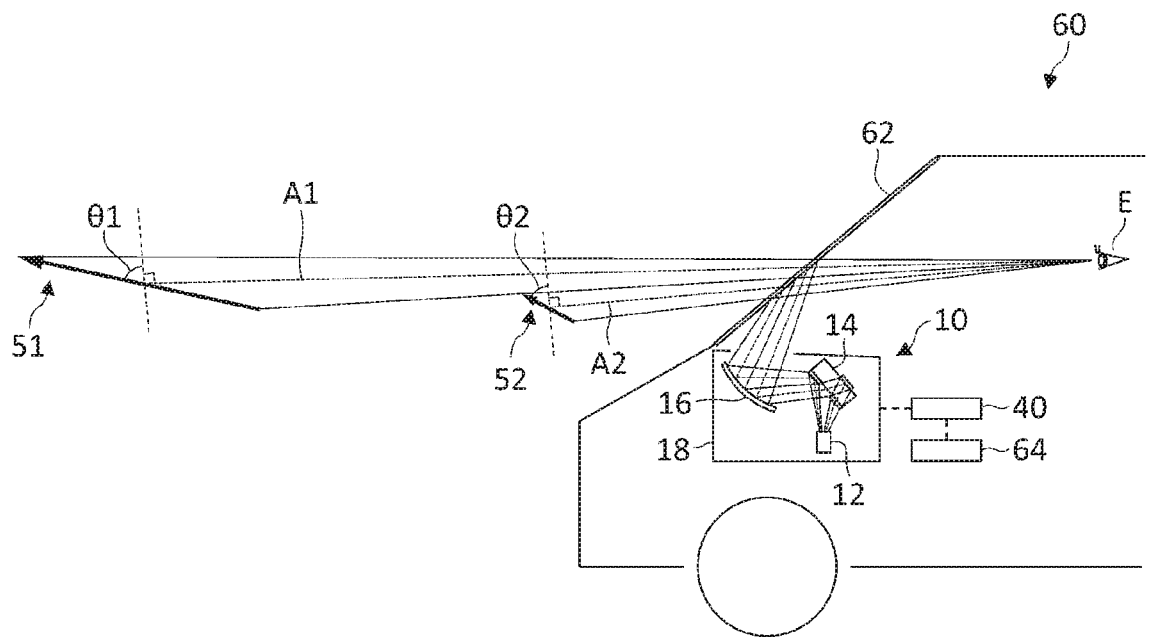
FIG. 1 schematically shows the configuration of a virtual image display device according to the embodiment.

FIG. 1 schematically shows the configuration of a virtual image display device according to the embodiment; In this embodiment, the virtual image display device 10 is installed in a dashboard of a vehicle 60, which exemplifies a moving object. The virtual image display device 10 is a so-called head-up display device. The virtual image display device 10 presents virtual images (a first virtual image 51 and a second virtual image 52) in front of the vehicle 60 in the direction of travel (leftward direction in FIG. 1) by projecting an image display light toward a windshield 62, which represents a virtual image presentation plane. The user E (e.g., the driver) can see the virtual image superimposed on the actual scenery via the windshield 62. Therefore, the driver E can access information shown in the virtual image substantially without moving the line of sight while driving the vehicle.

The virtual image display device 10 presents virtual images at a plurality of different positions in the direction of depth as viewed from a user E. The virtual image display device 10 presents the first virtual image 51 presented at a remote position as viewed from the user E and the second virtual image 52 presented at a close position as viewed from the user E. The first virtual image 51 is presented to be viewable, for example, at a position of about 5 m-10 m in front of the user E and is presented in the direction of line of sight A1 (also referred to as the first direction of line of sight) in which the user E sees a relatively long distance. The second virtual image 52 is presented to be viewable, for example, at a position of about 2 m-3 m in front of the user E and is presented in the direction of line of sight A2 (also referred to as the second direction of line of sight) which is below the first direction of line of sight A1 and in which the user E sees a relatively short distance.

The first virtual image 51 and the second virtual image 52 are presented at an angle in the direction of depth in relation to the directions of line of sight A1 and A2. The virtual images 51 and 52 are presented such that the top of the virtual images 51 and 52 as viewed from the user E is farther and the bottom thereof is nearer. Further, the virtual images 51 and 52 are presented such that the angle of inclination $\theta 1$ of the first virtual image 51 presented farther is larger than the angle of inclination $\theta 2$ of the second virtual image presented nearer. As a result, the first virtual image 51 presented farther is displayed in a mode in which a greater depth is felt than the second virtual image 52 presented nearer.

The virtual image display device 10 includes a projection unit 12, an intermediate image formation unit 14, a projection mirror 16, a housing 18, and a control unit 40. The projection unit 12 generates an image display light for presenting the first virtual image 51 and the second virtual image 52 and projects the generated image display light onto the intermediate image formation unit 14. The image display light projected by the projection unit 12 includes a first display light for displaying the first virtual image 51 and a second display light for displaying the second virtual image 52.

The intermediate image formation unit 14 forms a real image based on the image display light projected from the projection unit 12. The intermediate image formation unit 14 includes a transmission-type screen on which the first display light forms an image and a reflection-type screen on which the second display light forms an image. The intermediate image formation unit 14 has a reference surface that the image display light from the projection unit 12 is incident on. Both the transmission-type screen and the reflection-type screen are provided on the same reference surface. Therefore, the "reference surface" of the intermediate image formation unit 14 can be said to be a plane that serves as a reference for the positions where the first display light and the second display light are imaged.

The intermediate image formation unit 14 is configured such that the positions where the first display light and the second display light are imaged as viewed from the projection mirror 16 differ. This causes the first virtual image 51 and the second virtual image 52 to be presented at different positions in the direction of depth. More specifically, the first display light is transmitted through the transmission-type screen before being reflected inside the intermediate image formation unit 14 and traveling toward the projection mirror 16. The second display light is reflected by the reflection-type screen and travels toward the projection mirror 16. The detailed configuration of the intermediate image formation unit 14 will be described later.

The projection mirror 16 reflects the image display light output from the intermediate image formation unit 14 toward the windshield 62. The projection mirror 16 is, for example, a concave mirror and enlarges a real image on the intermediate image formation unit 14 and presents the enlarged image to the user E. The user E perceives the real image formed on the intermediate image formation unit 14 by seeing a virtual image. The projection mirror 16 may be configured such that the direction of reflecting the image display light is variable or may be connected to a driving mechanism for changing the orientation.

The housing 18 houses the projection unit 12, the intermediate image formation unit 14, and the projection mirror 16 inside. The positions of the projection unit 12 and the intermediate image formation unit 14 are determined relative to the housing 18 so that the relative positions thereof are determined by the housing 18. Therefore, the housing 18 can be said to be a fixing member in which the projection unit 12 and the intermediate image formation unit 14 are mounted. The projection unit 12 and the intermediate image formation unit 14 may be mounted on a fixing member separate from the housing 18, and that fixing member may be fixed to the housing 18. The orientation of the projection mirror 16 relative to the housing 18 may be fixed. Alternatively, the projection mirror 16 may be fixed to the housing 18 via a driving mechanism so that the orientation relative to the housing 18 is variable.

The control unit 40 generates an image for display and operates the projection unit 12, the intermediate image formation unit 14, and the projection mirror 16 to present a virtual image corresponding to the image for display. The control unit 40 is connected to an external device 64 and generates the image for display based on the information from the external device 64.

The external device 64 is a device for generating original data for an image displayed as the virtual image. For example, the external device 64 may be an Electronic Control Unit (ECU) for the vehicle 60, a navigation device, or a mobile device such as a cell phone, smartphone, and tablet. The external device 64 transmits, to the control unit 40, image data necessary to display the virtual image, information indicating the content and type of the image data, and information related to the vehicle 60 such as the speed and current position of the vehicle 60.

Figure 2:
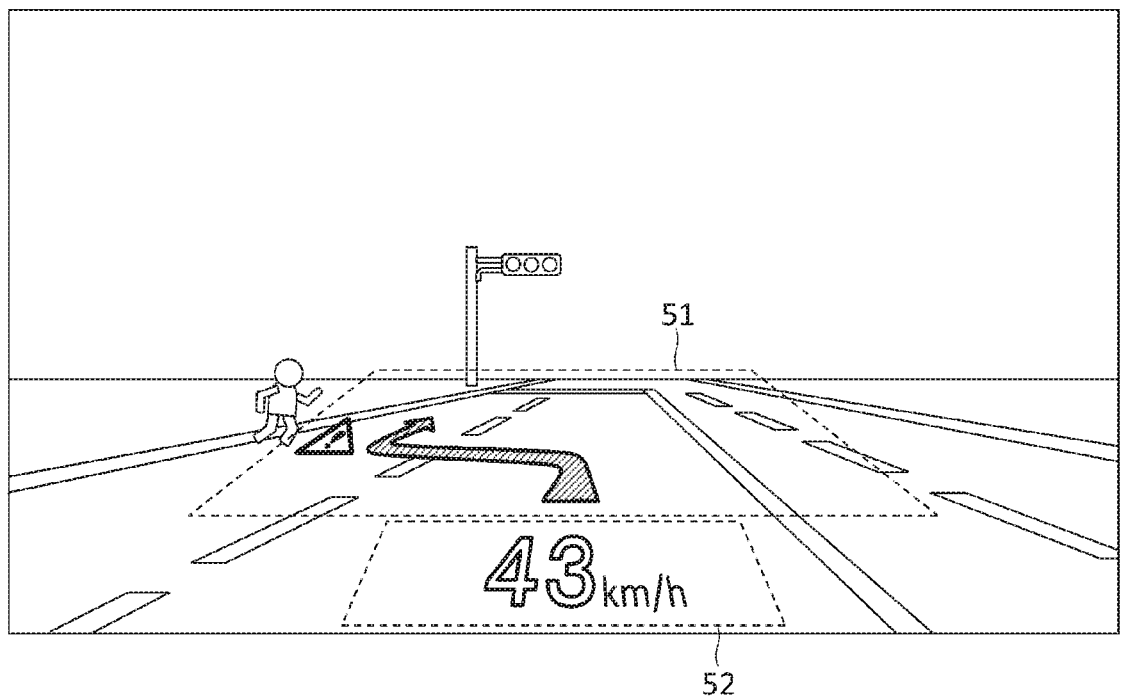
FIG. 2 schematically shows examples of the first virtual image and the second virtual image of FIG. 1.

FIG. 2 schematically shows examples of the first virtual image 51 and the second virtual image 52 of FIG. 1 and schematically shows a field of view in front of the vehicle as viewed from the user E. As shown in the figure, the first virtual image 51 is presented relatively toward the top, and the second virtual image 52 is presented relatively toward the bottom. The content desired to be superimposed on the scenery in front of the vehicle is displayed in a display area of the first virtual image 51. For example, an arrow image giving a guidance on a traveling route of the vehicle 60, an alert image alerting the user of a person who jumps into a space in front of the vehicle 60, an obstacle, etc. are displayed. The content not so much desired to be superimposed on the scenery in front of the vehicle is displayed in a display area of the second virtual image 52. For example, information shown in an indicator on the instrument panel (e.g., the speed of the vehicle 60), road regulation information such as the speed limit related to the road being traveled, etc. are displayed.

Figure 3:
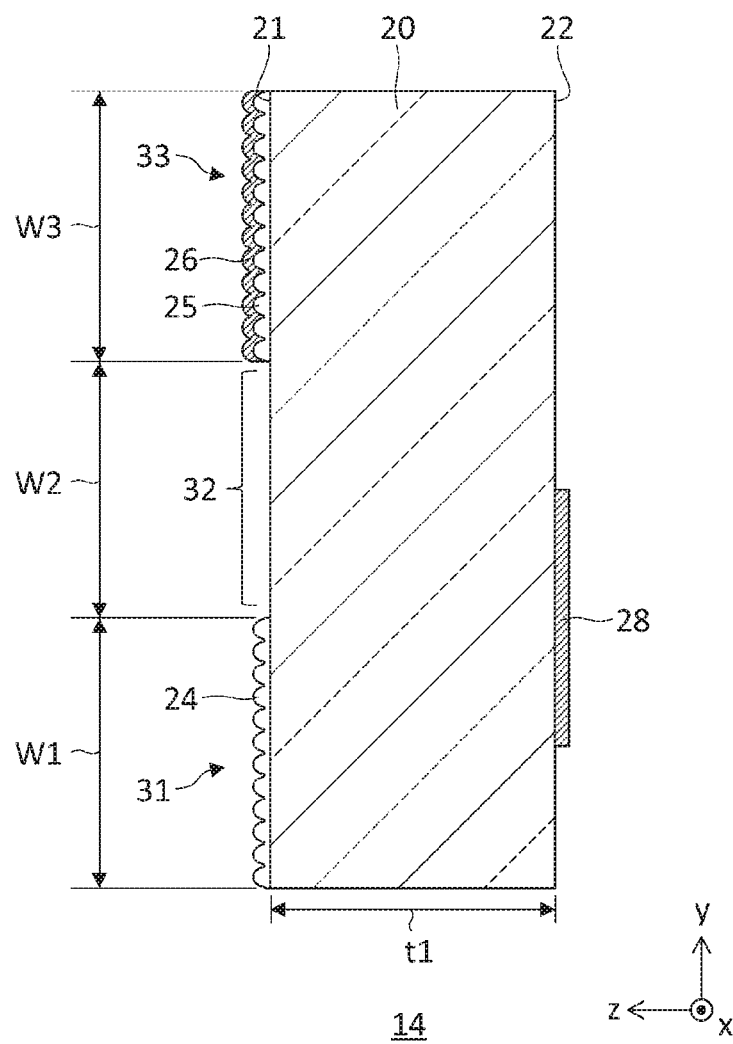
FIG. 3 is a cross-sectional diagram schematically showing the configuration of the intermediate image formation unit according to the embodiment.

FIG. 3 is a cross-sectional diagram schematically showing the configuration of the intermediate image formation unit 14 according to the embodiment. The intermediate image formation unit 14 is provided with a substrate 20 in which a transmission-type screen 31 and a reflection-type screen 33 are provided. The substrate 20 includes a first principal surface 21 and a second principal surface 22 opposite to the first principal surface 21. The substrate 20 is made of a material adapted to transmit an image display light. For example, the substrate 20 is made of a transparent resin material. Referring to FIG. 3, the direction of the thickness t1 of the substrate 20 is defined as the z direction, and the directions along the plane of the first principal surface 21 and the second principal surface 22 are defined as the x direction and the y direction.

The first principal surface 21 is a "reference surface" described above that determines the imaging positions of the first display light and the second display light, and the transmission-type screen 31 and the reflection-type screen 33 are provided on the first principal surface 21. The transmission-type screen 31 is provided in the first area W1 on the first principal surface 21, and the reflection-type screen 33 is provided in the third area W3 on the first principal surface 21. The second area W2 located between the first area W1 and the second area W2 is a light-transmissive window 32 and differs from the first area W1 and the third area W3 in that a screen is not provided.

On the first principal surface 21, the first area W1, the second area W2, and the third area W3 are arranged in the stated order in a predetermined direction (the y direction in FIG. 3) along the first principal surface 21 and are configured such that the widths of the areas W1, W2, and W3 in the y direction are substantially the same. The areas W1-W3 on the first principal surface 21 may not have the same width in the y direction but may have different widths. Moreover, two of the three areas W1-W3 on the first principal surface 21 may have the same width in the y direction. For example, the first area W1 and the second area W2 may have the same width in the y direction, and the width of the third area W3 in the y direction may be different from the width of the first area W1 and the second area W2 in the y direction.

The transmission-type screen 31 is comprised of, for example, a first microlens array 24 provided in the first area W1 on the first principal surface 21. The first microlens array 24 is made of a transparent resin material or the like. For example, the first microlens array 24 is made of a material having the same refractive index as the substrate 20 or the same material as that of the substrate 20.

The first microlens array 24 may be shaped in a convex lens or shaped in a concave lens. The transmission-type screen 31 may not be comprised of a microlens array. For example, micro-asperities may be provided on the surface, or the screen may be comprised of a light diffusion film in which diffusion beads having a diameter of about 10-100 microns may be distributed.

The reflection-type screen 33 is comprised of a second microlens array 25 provided in the third area W3 on the first principal surface 21 and a reflective layer 26 provided on the surface of the second microlens array 25. The reflective layer 26 has a shape that reflects the surface shape of the second microlens array 25 and diffuses and reflects the image display light incident on the reflective layer 26. The second microlens array 25 is made of a transparent resin material or the like. For example, the second microlens array 25 is made of a material having the same refractive index as the substrate 20 or the same material as that of the substrate 20. The second microlens array 25 may have the same shape as the first microlens array 24 or a different shape. The reflective layer 26 may be made of a metallic material such as aluminum or formed by a dielectric multi-layer film or the like.

The second principal surface 22 is provided with a reflective part 28. The reflective part 28 is provided at a position it can reflect the image display light transmitted through the transmission-type screen 31 in the first area W1 toward the light-transmissive window 32 in the second area W2. The reflective part 28 is provided at least near the boundary between the first area W1 and the second area W2 and is provided to extend across the first area W1 and the second area W2. The reflective part 28 is provided only in a part of the second principal surface 22. For example, the reflective part 28 is provided such that the width thereof in the y direction is substantially equal to the width of the first area W1 or the second area W2 in the y direction. The reflective part 28 may be provided to extend in a range wider than illustrated. For example, the reflective part 28 may be provided on the entirety of the second principal surface 22.

The substrate 20 is configured such that the width of the transmission-type screen 31 or the reflection-type screen 33 in the y direction is substantially equal to the thickness t1 of the substrate 20. The thickness t1 of the substrate 20 is configured to be, for example, in a range not less than 0.5 times and not more than twice the width of the transmission-type screen 31 in the y direction. By configuring the thickness t1 of the substrate 20 to be in such a range, an appropriate light path (optical arrangement) as shown in FIG. 6 described later is obtained.

Figure 4:
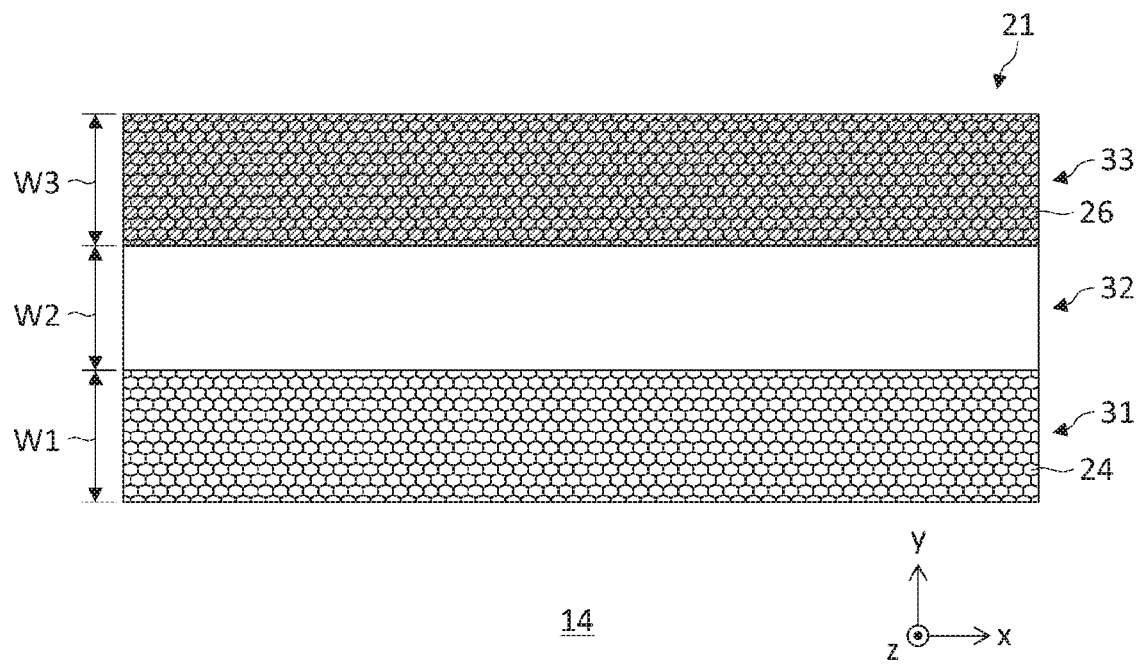
FIG. 4 is a plan view schematically showing the configuration of the first principal surface of the intermediate image formation unit of FIG. 3.

FIG. 4 is a plan view schematically showing the configuration of the first principal surface 21 of the intermediate image formation unit 14 of FIG. 3. The intermediate image formation unit 14 has a horizontally elongated shape in which the width thereof in the x direction is larger than the width in the y direction in which the first area W1, the second area W2, and the third area W3 are arranged. The first microlens array 24 having a honeycomb-shaped arrangement is provided in the first area W1, and the reflective layer 26 formed to have a honeycomb shape is provided in the third area W3. The light-transmissive window 32 is provided between the transmission-type screen 31 in the first area W1 and the reflection-type screen 33 in the third area W3.

Figure 5:
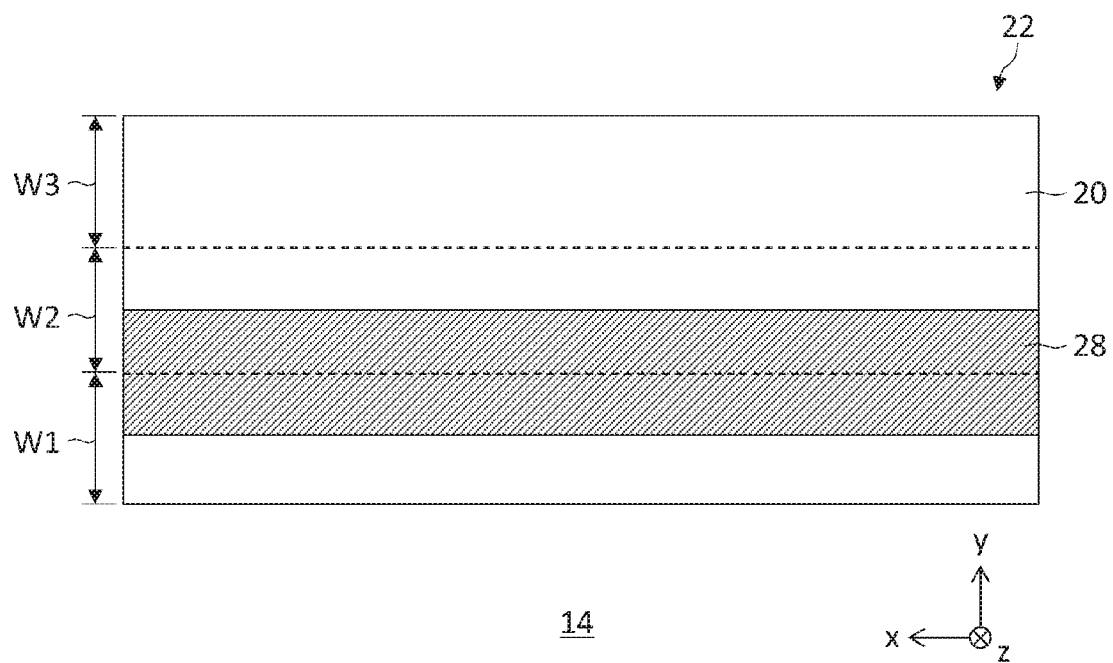
FIG. 5 is a plan view schematically showing the configuration of the second principal surface of the intermediate image formation unit of FIG. 3.

FIG. 5 is a plan view schematically showing the configuration of the second principal surface 22 of the intermediate image formation unit 14 of FIG. 3. As shown in the figure, the reflective part 28 is provided near the boundary between the first area W1 and the second area W2 and is provided to occupy an area of substantially the same size as the first area W1 or the second area W2.

Figure 6:
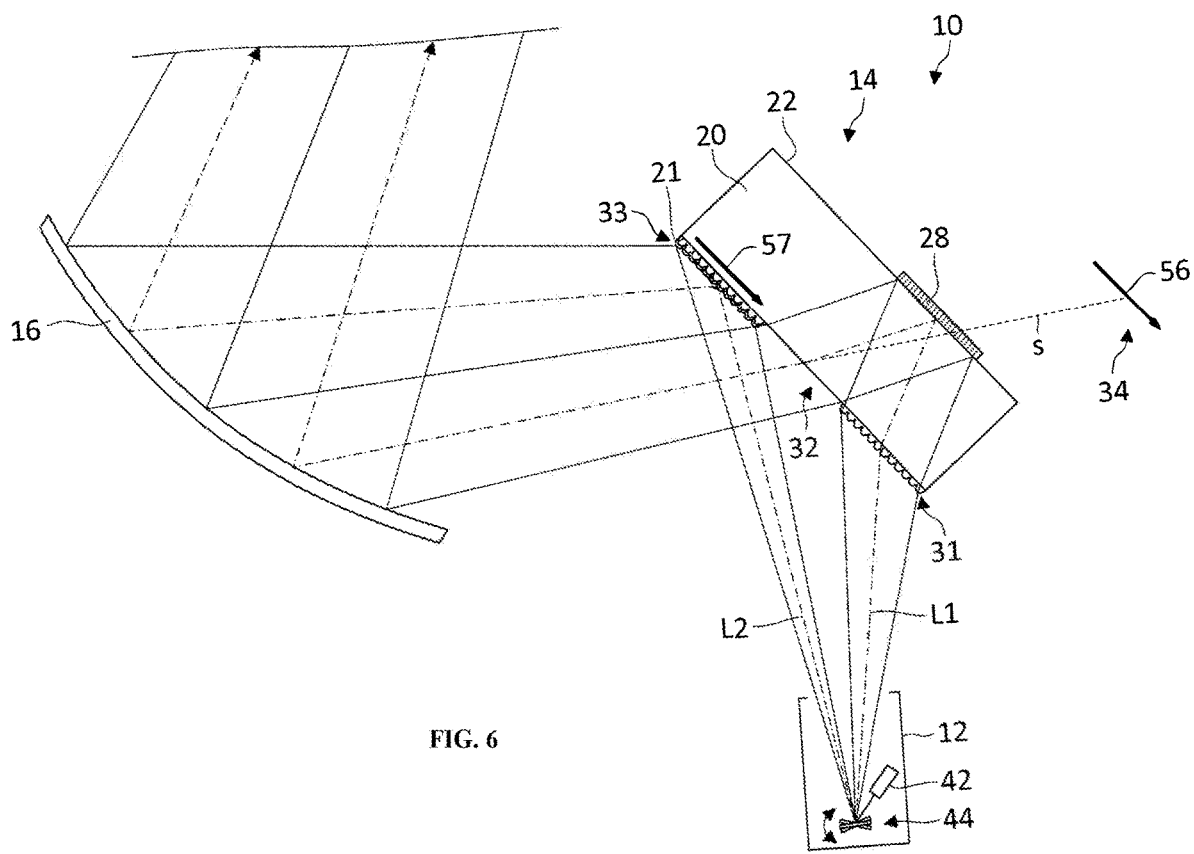
FIG. 6 shows the internal configuration of the virtual image display device of FIG. 1 in detail.

FIG. 6 shows the internal configuration of the virtual image display device 10 of FIG. 1 in detail. The projection unit 12 is configured to generate the image display light according to the raster scan system and is provided with a light source 42 and a modulation and scanning unit 44 that modulates and scans the illumination light from the light source 42. The light source 42 is a laser light source and is configured to output, for example, a laser light of three primary colors (red, green, and blue). The modulation and scanning unit 44 is, for example, a micro electro mechanical systems (MEMS) mirror and operates to guide the laser light from the light source 42 toward the first principal surface 21 of the intermediate image formation unit 14 for a raster scan.

The figure shows an example in which a single modulation and scanning unit 44 modulates the laser light and performs a raster scan. The configuration of the modulation and scanning unit 44 is not limited to the illustrated example. A plurality of scanning mirrors may be combined for a raster scan. For example, a horizontal scanning mirror and a vertical scanning mirror may be combined. The projection unit 12 may generate an image display light by using a two-dimensional image display device. For example, the projection unit 12 may use an image display device of so-called projection type that uses a digital micromirror device (DMD), a liquid crystal on silicon (LCOS) panel, a thin film transistor liquid crystal display panel, etc. to generate an intermediate image. When an image display device is used, it is preferred to use a light source adapted to generate an illumination light of a format suitable for the image display device used.

The projection unit 12 is provided such that the image display light projected is diagonally incident on the reference surface (the first principal surface 21) of the intermediate image formation unit 14. The angle of incidence of the image display light on the reference surface (the first principal surface 21) is, for example, not less than 30° and not more than 60°, and, typically, about 40°-50°. The first display light L1 incident on the transmission-type screen 31 is transmitted through the transmission-type screen 31 and arrives at the reflective part 28 via the interior of the substrate 20. The first display light L1 is reflected by the reflective part 28 to change its direction, is output outside the intermediate image formation unit 14 via the light-transmissive window 32, and travels toward the projection mirror 16. The second display light L2 incident on the reflection-type screen 33 is reflected by the reflection-type screen 33, changes its direction, and travels toward the projection mirror 16.

Figure 7:
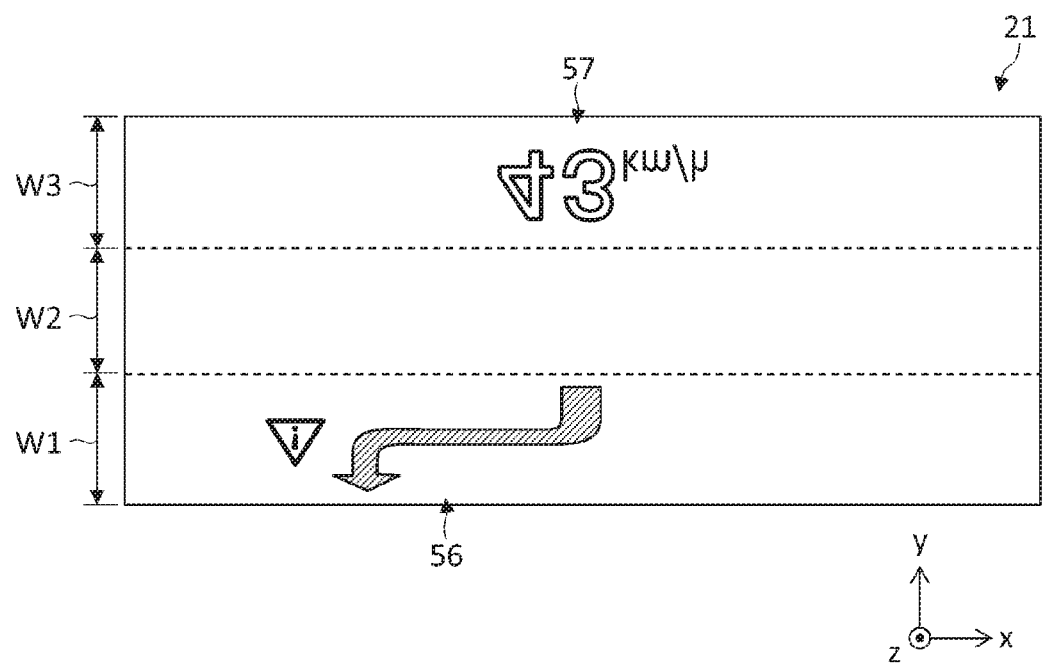
FIG. 7 schematically shows an image display light projected onto the intermediate image formation unit.

FIG. 7 schematically shows an image display light projected onto the intermediate image formation unit 14 and shows an example of real images formed on the reference surface (the first principal surface 21) of the intermediate image formation unit 14. A first real image 56 based on the first display light L1 is formed on the first area W1, and a second real image 57 based on the second display light L2 is formed on the third area W3. The first real image 56 and the second real image 57 of FIG. 7 correspond to the first virtual image 51 and the second virtual image 52 of FIG. 2, respectively. Due to the relative arrangement of the projection mirror 16 and the windshield 62, the image display light is projected in an orientation that locates the first area W1 at the top of the image and locates the third area W3 at the bottom of the image.

It is preferred that the image display light projected from the projection unit 12 be comprised substantially only of the first display light L1 traveling toward the transmission-type screen 31 and the second display light L2 traveling toward the reflection-type screen 33. The majority of the light traveling from the projection unit 12 toward the light-transmissive window 32 is transmitted through the substrate 20 and output outside from the second principal surface 22, but a portion of the light incident on the light-transmissive window 32 is reflected by the surface (the first principal surface 21) of the light-transmissive window 32 and travels toward the projection mirror 16. The light reflected by the surface (the first principal surface 21) of the light-transmissive window 32 is superimposed on the first display light L1 and travels toward the eyes of the user E. Therefore, the light can impact the display of the first virtual image 51 based on the first display light L1. In order to reduce the impact, it is preferred that the intensity of the light traveling from the projection unit 12 toward the light-transmissive window 32 be sufficiently small. For example, it is preferred, in the example of display shown in FIG. 7, that the display light corresponding to the displayed image be projected onto the first area W1 and the third area W3, and a display light corresponding to a black image be projected onto the second area W2. In essence, it is preferred that light, having a brightness lower than a predetermined value and so low that the light can be regarded as presenting the black color, be projected onto the second area W2, and the display light having a high brightness equal to or higher than a predetermined value be projected onto the first area W1 and the third area W3.

The projection unit 12 shown in FIG. 6 may operate to project the image display light only onto the first area W1 and the third area W3 and substantially not to project the image display light onto the second area W2. For example, the modulation and scanning unit 44 may operate to perform a raster scan in the first area W1, skip the second area W2, and perform a raster scan in the third area W3. In other words, the first area W1 and the third area W3 may be scanned, and the second area W2 may be skipped in the scanning. Alternatively, it may be ensured that the brightness of light projected onto the second area W2 is lower than a predetermined value by configuring the density of scanning the second area W2 to be lower than the density of scanning the first area W1 and the third area W3. Still alternatively, the projection unit 12 may operate an image display device to generate an image display light such that the pixels corresponding to the second area W2 present the black color.

According to the arrangement of FIG. 6, the first display light L1 forming an image on the transmission-type screen 31 is viewed by the user E as the first virtual image 51, and the second display light L2 forming an image on the reflection-type screen 33 is viewed by the user E as the second virtual image 52. The reference surface (the first principal surface 21 on which the transmission-type screen 31 and the reflection-type screen 33 are provided is tilted with respect to the projection mirror 16 so that the first virtual image 51 and the second virtual image 52 viewed by the user E are also presented at an angle with respect to the direction of line of sight. The first display light L1 forming an image on the transmission-type screen 31 is reflected by the reflective part 28 before traveling toward the projection mirror 16. Therefore, the transmission-type screen 31 is viewed as being located farther than the reflection-type screen 33 as viewed from the projection mirror 16. More specifically, it looks as if the first real image 56 based on the first display light L1 is located at the position of a mirror image 34 of the transmission-type screen 31 formed by the reflective part 28. As a result, the first virtual image 51 is presented at a position farther by a distance corresponding to the length of a broken line s extending from the light-transmissive window 32 to the mirror image 34.

Due to the relative arrangement as illustrated, the first real image 56 is located at a position farther backward in the direction of tilt of the second real image 57 formed on the reflection-type screen 33. This can present the first virtual image 51 farther backward in the direction of tilt of the second virtual image 52 viewed toward the user E in the direction of line of sight of the user E. As a result, the first virtual image 51 and the second virtual image 52 can be presented at different positions in the direction of depth in a more natural relative arrangement than in the related art. Accordingly, the virtual image display device 10 according to the embodiment allows virtual images to be presented in a more suitable mode than in the related art.

According to the embodiment, the intermediate image formation unit 14 is formed in an integrated manner and in a shape of a single plate. Therefore, the number of components is reduced as compared with the case of forming the reflective part 28, the transmission-type screen 31, and the reflection-type screen 33 as separate components. Further, since the reflective part 28, the transmission-type screen 31, and the reflection-type screen 33 that define the position of presentation of the first virtual image 51 and the second virtual image 52 are fixed relative to a single reference surface (the first principal surface 21), an alignment for adjusting the relative arrangement of these members is not necessary. As a result, the manufacturing cost of the virtual image display device 10 is reduced as compared with the case where the intermediate image formation unit 14 is formed by a plurality of components.

According to the embodiment, the angles of tilt $\theta1$ and $\theta2$ of the first virtual image 51 and the second virtual image 52 can differ regardless of the fact that the first real image 56 and the second real image 57 are formed on the same reference surface. In other words, the angle of tilt $\theta1$ of the first virtual image 51 can be configured to be larger than the angle of tile $\theta2$ of the second virtual image 52 regardless of the fact that the angles of tilt of the first real image 56 and the second real image 57 relative to the projection mirror 16 are equal to each other. This is because the larger the distance from the projection mirror 16 to the real image, the larger the magnification factor of the associated virtual image and larger the angle of tilt of the virtual image presented. In other words, according to the embodiment, the angle of tilt $\theta1$ of the first virtual image 51 presented farther can be configured to be larger than the angle of tilt $\theta2$ of the second virtual image 52 presented nearer. This ensures that the first virtual image 51 presented farther is displayed in a mode in which a greater depth is felt than in the second virtual image 52 presented nearer.

To present the first virtual image 51 and the second virtual image 52 at predetermined angles of tilt $\theta1$ and $\theta2$, the relationship between the direction of projection of the projection unit 12 and the orientation of the intermediate image formation unit 14 is critical in this embodiment. To improve the precision of the positions of the projection unit 12 and the intermediate image formation unit 14, a dedicated fixing member for defining the relative positions of the projection unit 12 and the intermediate image formation unit 14 may be provided. The projection unit 12 and the intermediate image formation unit 14 may form an integrated module of image display light generation unit by being mounted on the fixing member. The image display light generation unit may be provided with the projection unit 12, the intermediate image formation unit 14, and the fixing member, and the fixing member may define the relative positions of the projection unit 12 and the intermediate image formation unit 14 as shown in FIG. 6. The fixing member may realize an optical arrangement in which the first display light L1 forms an image on the transmission-type screen 31, is transmitted through the transmission-type screen 31, is reflected by the reflective part 28, is transmitted through the light-transmissive window 32 in the second area W2, and is output from the intermediate image formation unit 14. The fixing member may further realize an optical arrangement in which the second display light L2 is reflected by the reflection-type screen 33 and is output from the intermediate image formation unit 14.

The present invention has been described above with reference to the embodiment but is not limited to the embodiment. Appropriate combinations or replacements of the features of the illustrated examples are also encompassed by the present invention.

Figure 8:
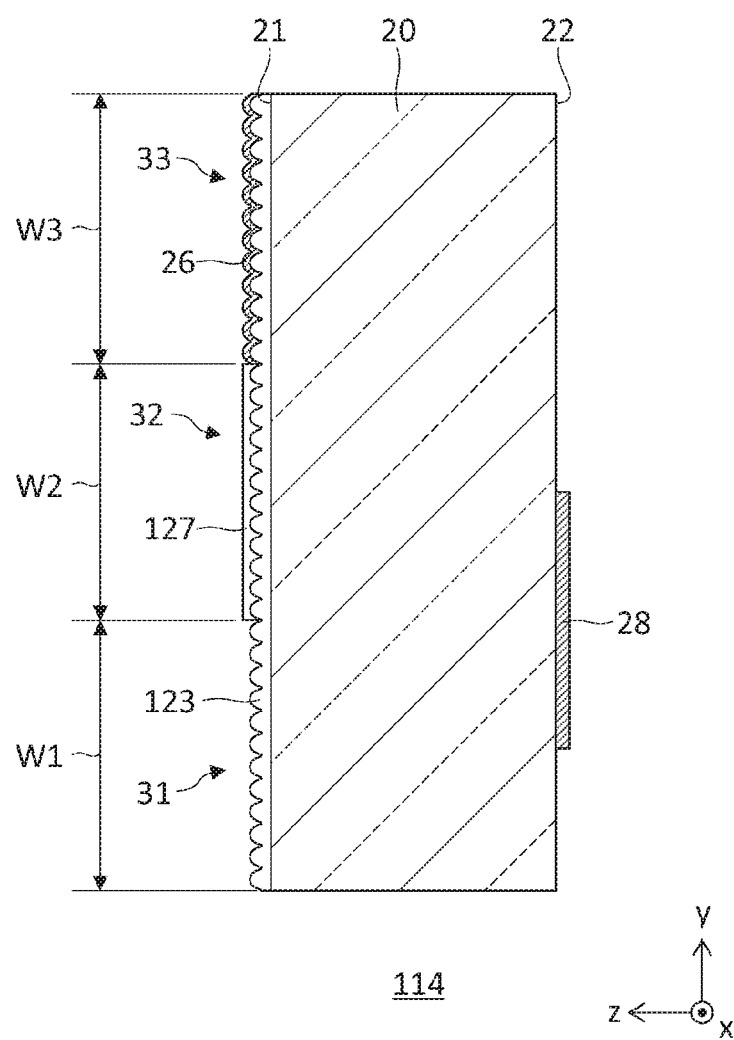
FIG. 8 is a cross-sectional view schematically showing the configuration of an intermediate image formation unit according to a variation.

FIG. 8 is a cross-sectional view schematically showing the configuration of an intermediate image formation unit 114 according to a variation. This variation differs from the embodiment in that a microlens array 123 is formed on the entirety of the first principal surface 21 of the substrate 20. In the first area W1 on the first principal surface 21, the microlens array 123 forms the transmission-type screen 31. In the third area W3 on the first principal surface 21, the reflective layer 26 provided on the microlens array 123 forms the reflection-type screen 33.

A flattening layer 127 for filling the asperities on the surface of the microlens array 123 to form a flat surface is provided in the second area W2 on the first principal surface 21. Therefore, the light-transmissive window 32 in the second area W2 is formed by the microlens array 123 and the flattening layer 127. The flattening layer 127 is made of a material having the same refractive index as the microlens array 123 or the same material as that of the microlens array 123. This ensures that the interface between the microlens array 123 and the flattening layer 127 does not function as a screen.

The variation provides the same function as the embodiment described above. According to this variation, the substrate 20 in which the microlens array 123 is formed on the entirety of the first principal surface 21, i.e., a general-purpose microlens array sheet, is used as base to form the intermediate image formation unit 114 so that the manufacturing cost of the intermediate image formation unit 114 is reduced.

Figure 9:
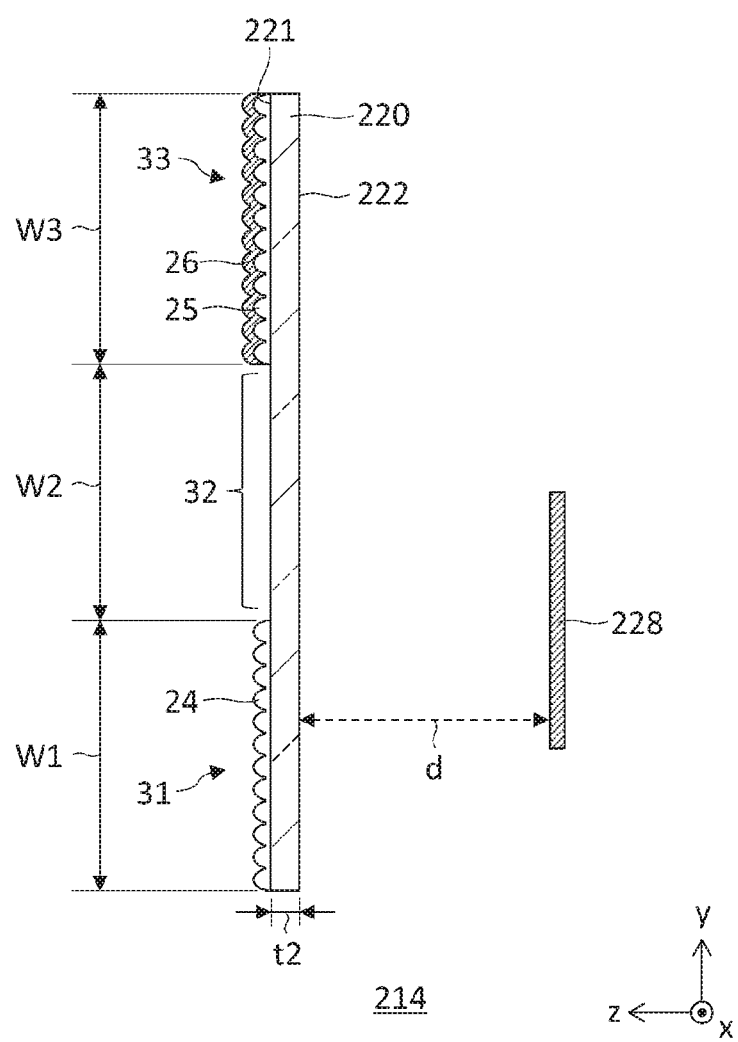
FIG. 9 is a cross-sectional view schematically showing the configuration of an intermediate image formation unit according to a variation.

FIG. 9 is a cross-sectional view schematically showing the configuration of an intermediate image formation unit 214 according to a variation. This variation differs from the embodiment in that a substrate 220 in which the transmission-type screen 31, the light-transmissive window 32, and the reflection-type screen 33 are provided is separate from a reflective part 228. The substrate 220 includes a first principal surface 221 and a second principal surface 222, and the transmission-type screen 31, the light-transmissive window 32, and the reflection-type screen 33 are provided on the first principal surface 221. On the other hand, the reflective part 228 is not provided on the second principal surface 222.

The thickness t2 of the substrate 220 is smaller than the thickness t1 of the substrate 20 according to the embodiment. For example, the thickness t2 is less than 0.5 times the width of the transmission-type screen 31 in the y direction. The reflective part 228 is provided at a position distanced from the second principal surface 222 so as to face the second principal surface 222. The distance d between the substrate 220 and the reflective part 228 is substantially equal to the width of the transmission-type screen 31 in the y direction. For example, the distance d is configured to be in a range not less than 0.5 times and not more than twice the width of the transmission-type screen 31 in the y direction. The variation provides the same function as the embodiment described above.

In the embodiment described above, the real image formed on the transmission-type screen 31 and the reflection-type screen 33 is enlarged and presented as a virtual image by configuring the projection mirror 16 as a concave mirror. In one variation, the real image formed on the transmission-type screen 31 and the reflection-type screen 33 may be enlarged and presented by using an optical device of transmission type such as a convex lens. For example, the optical device of transmission type such as a convex lens may be provided between the intermediate image formation unit 14 and the projection mirror 16 or between the projection mirror 16 and the windshield 62. In the case an optical device such as a convex lens is used, the projection mirror 16 may be comprised of a flat surface or a concave surface.

It should be understood that the invention is not limited to the above-described embodiment but may be modified into various forms on the basis of the spirit of the invention. Additionally, the modifications are included in the scope of the invention.

What is claimed is:

1. A virtual image display device comprising:
a projection unit that projects an image display light;
an intermediate image formation unit on which a real image based on the image display light is formed; and
a projection mirror that reflects the image display light output from the intermediate image formation unit toward a virtual image presentation plane, wherein
the intermediate image formation unit includes a reference surface on which the image display light is incident and a reflective part that reflects a portion of the image display light transmitted through the reference surface toward the reference surface,
the reference surface includes a first area, a second area, and a third area arranged in a stated order in a predetermined direction along the reference surface,
the first area is provided with a transmission-type screen on which a first display light that is a portion of the image display light forms an image, and the third area is provided with a reflection-type screen on which a second display light that is another portion of the image display light forms an image,
the first display light is transmitted through the transmission-type screen, reflected by the reflective part, transmitted through the second area, and output toward the projection mirror, and
the second display light is reflected by the reflection-type screen and output toward the projection mirror.

2. The virtual image display device according to claim 1, wherein
the intermediate image formation unit includes a substrate adapted to transmit the image display light, the substrate includes a first principal surface and a second principal surface opposite to the first principal surface, the transmission-type screen and the reflection-type screen are provided on the first principal surface of the substrate, and the reflective part is provided on the second principal surface of the substrate.

3. The virtual image display device according to claim 2, wherein
a thickness of the substrate from the first principal surface to the second principal surface is not less than 0.5 times and not more than twice a width of the transmission-type screen in the predetermined direction.

4. The virtual image display device according to claim 1, wherein
the transmission-type screen is comprised of a microlens array.

5. The virtual image display device according to claim 1, wherein
the reflection-type screen is comprised of a reflective layer on a surface of a microlens array.

6. The virtual image display device according to claim 1, wherein
the second area is provided with a microlens array and a flattening layer having the same refractive index as the microlens array and forming a flat surface by filling asperities on a surface of the microlens array.

7. The virtual image display device according to claim 1, wherein
the intermediate image formation unit is provided such that an angle of incidence of the image display light on the reference surface is not less than 30° and not more than 60°.

8. The virtual image display device according to claim 1, wherein
the projection unit generates the image display light configured such that a luminance of light projected onto at least a portion of the first area and the third area is equal to or higher than a predetermined value, and a luminance of light projected onto the entirety of the second area is lower than the predetermined value.

9. The virtual image display device according to claim 1, wherein
the projection unit is configured to generate the image display light by a raster scan and operates to scan the first area and the third area but not to scan the second area.

10. An image display light generation unit comprising:
a projection unit that projects an image display light;
an intermediate image formation unit on which a real image based on the image display light is formed; and a fixing member on which the projection unit and the intermediate image formation unit are mounted, wherein the intermediate image formation unit includes a reference surface on which the image display light is incident and a reflective part that reflects a portion of the image display light transmitted through the reference surface toward the reference surface, the reference surface includes a first area, a second area, and a third area arranged in a stated order in a predetermined direction along the reference surface, the first area is provided with a transmission-type screen, and the third area is provided with a reflection-type screen, and the fixing member defines relative positions of the projection unit and the intermediate image formation unit such that i) a first display light that is a portion of the image display light forms an image on the transmission-type screen, is transmitted through the transmission-type screen, is reflected by the reflective part, is transmitted through the second area, and is output from the intermediate image formation unit, and ii) a second display light that is another portion of the image display light is reflected by the reflection-type screen and output from the intermediate image formation unit.

* * * * *